United States Patent [19]
Pinkerton

[11] Patent Number: 5,469,006
[45] Date of Patent: Nov. 21, 1995

[54] LORENTZ FORCE MAGNETIC BEARING UTILIZING CLOSED CONDUCTIVE LOOPS AND SELECTIVELY CONTROLLED ELECTROMAGNETS

[75] Inventor: Joseph F. Pinkerton, Austin, Tex.

[73] Assignee: Magnetic Bearing Technologies, Inc., Austin, Tex.

[21] Appl. No.: 162,313

[22] Filed: Dec. 6, 1993

Related U.S. Application Data

[63] Continuation-in-part of Ser. No. 996,192, Dec. 23, 1992, Pat. No. 5,302,874, which is a continuation-in-part of Ser. No. 950,607, Sep. 25, 1992, abandoned.

[51] Int. Cl.[6] .................................................. H02K 7/02
[52] U.S. Cl. ................................................. 310/90.5
[58] Field of Search ............................ 310/90.5, 68.3, 310/74

[56] References Cited

U.S. PATENT DOCUMENTS

| | | | |
|---|---|---|---|
| 3,470,828 | 10/1969 | Powell, Jr. et al. | 104/148 |
| 4,285,553 | 8/1981 | Robinson | 310/90.5 |
| 4,470,644 | 9/1984 | Weissere | 310/90.5 |
| 4,700,094 | 10/1987 | Downer et al. | 310/90.5 |
| 4,870,310 | 9/1989 | Triplett | 310/74 |
| 5,177,387 | 1/1993 | McMichael et al. | 310/90.5 |
| 5,302,874 | 4/1994 | Pinkerton | 310/90.5 |

Primary Examiner—Peter S. Wong
Assistant Examiner—E. To
Attorney, Agent, or Firm—Beveridge, DeGrandi, Weilacher & Young

[57] ABSTRACT

A magnetic bearing has electromagnets which are actively controlled to maintain a rotor at a prescribed position relative to a stator. Radial and axial bearings are disclosed. In each, conductive loops travel relatively through field zones which are associated with the electromagnets. Sensors provide signals indicative of deviations of the loops from their prescribed circular path, and these signals control the electromagnets selectively to change the magnetic field strengths. A loop current will be induced by the movement of a loop through a magnetic field. This current, in the presence of the magnetic field or fields will exert Lorentz forces on the loop in a radial and/or axial direction. These forces return the rotor to its prescribed position.

19 Claims, 4 Drawing Sheets

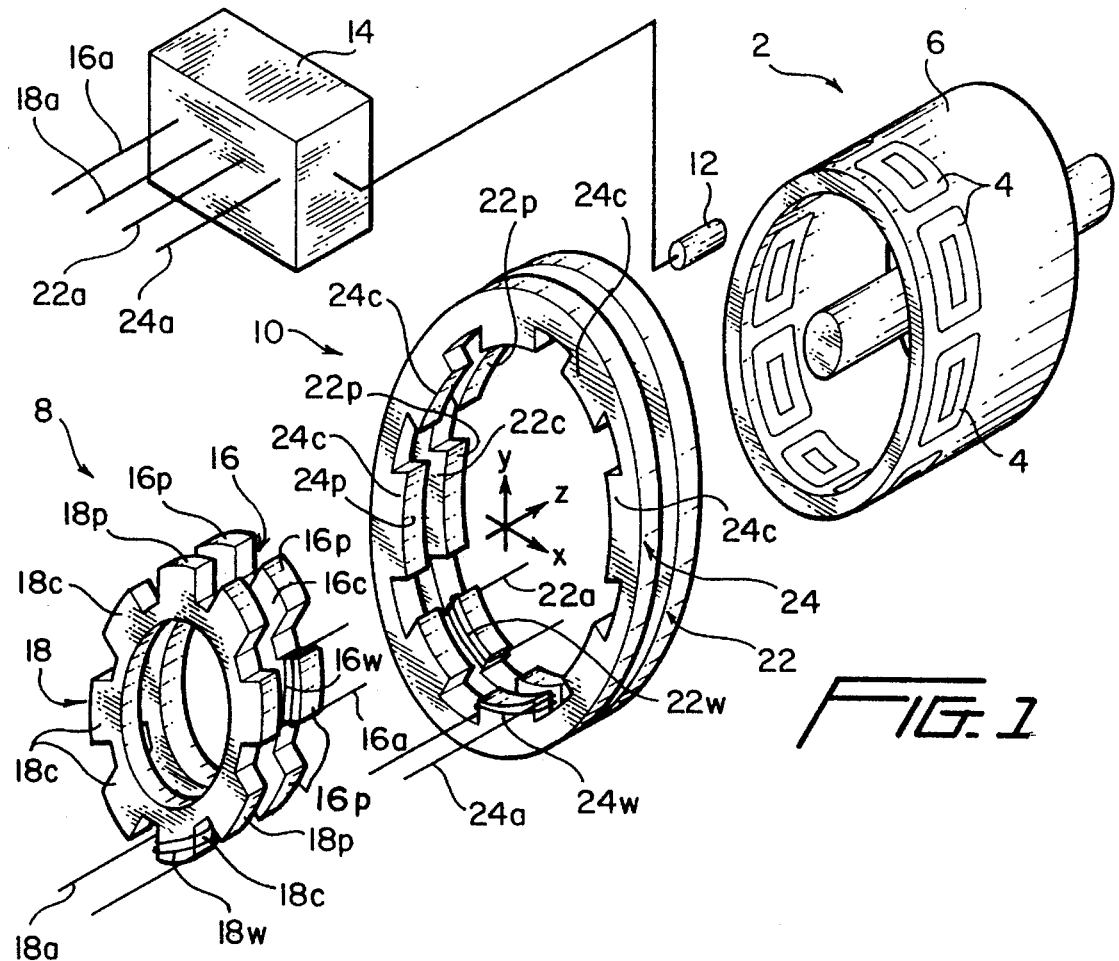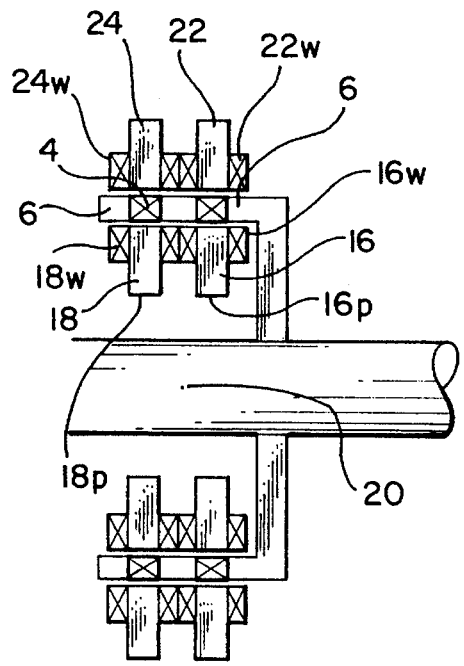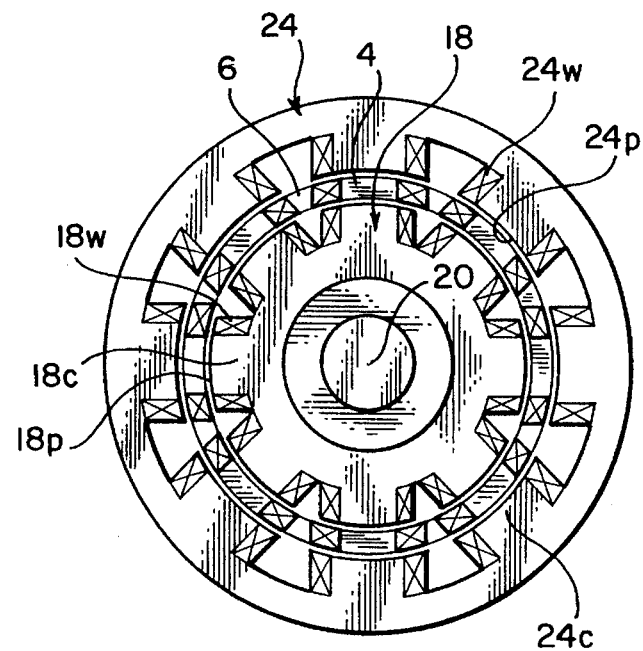

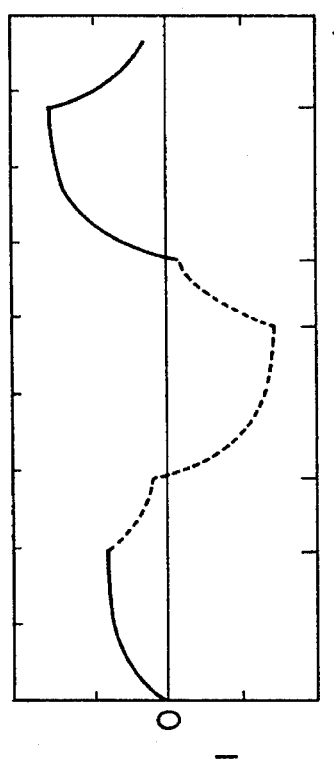
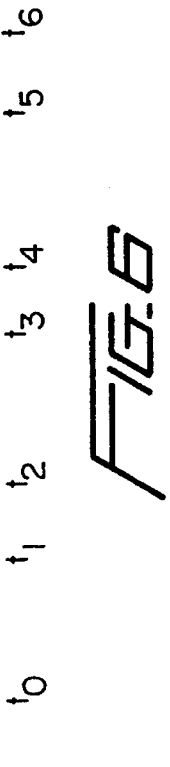
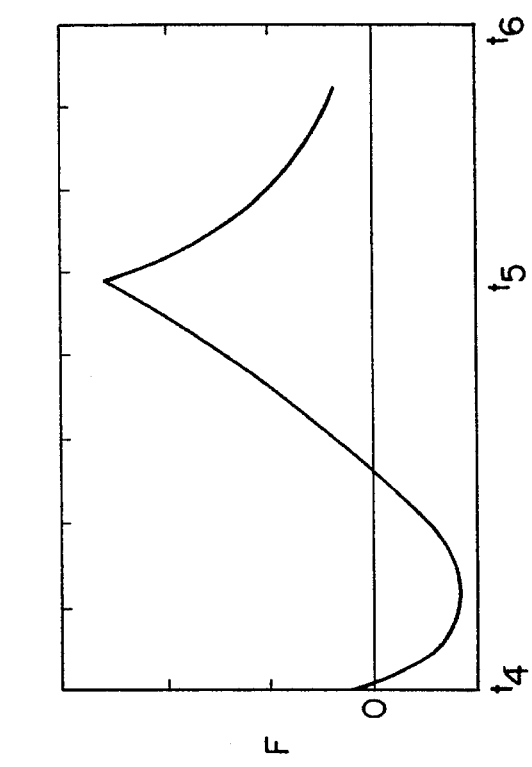
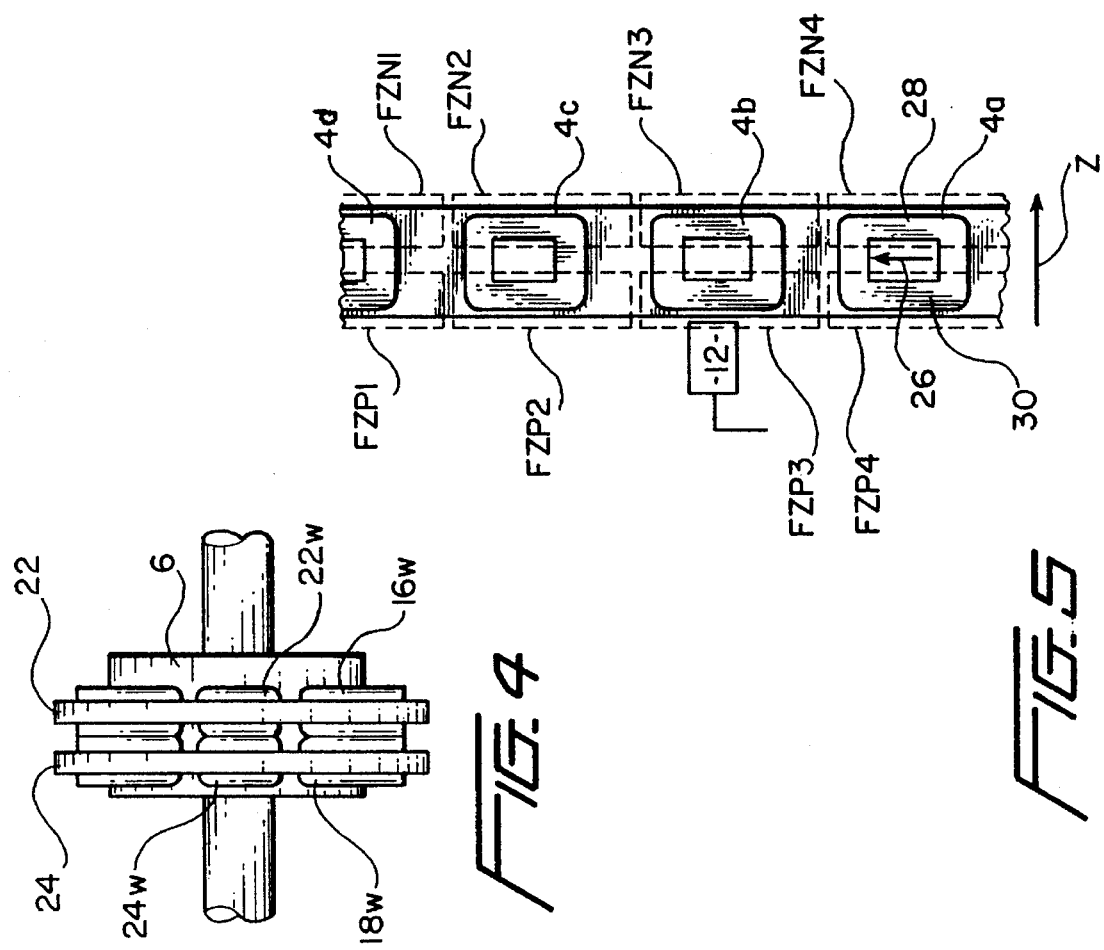

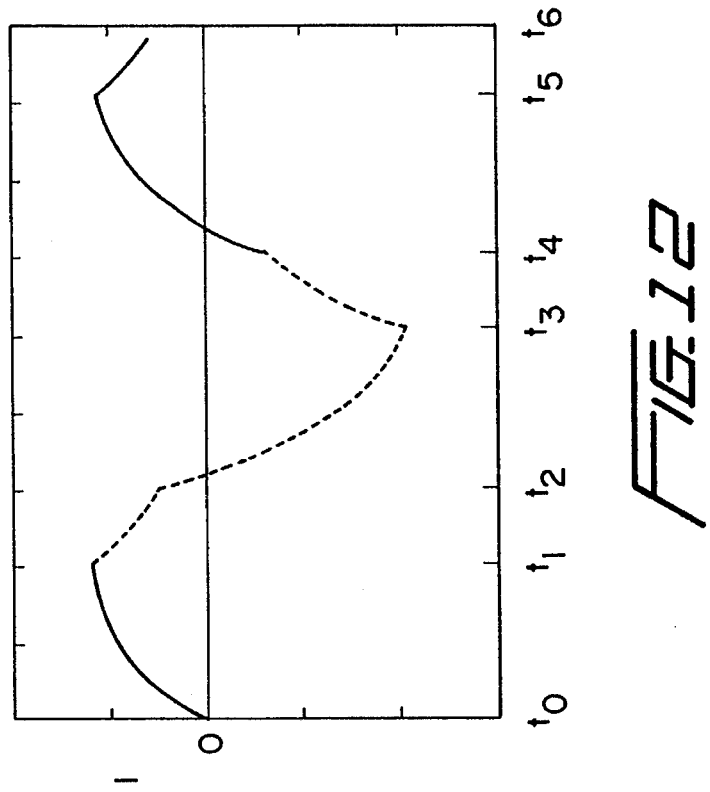
FIG. 12
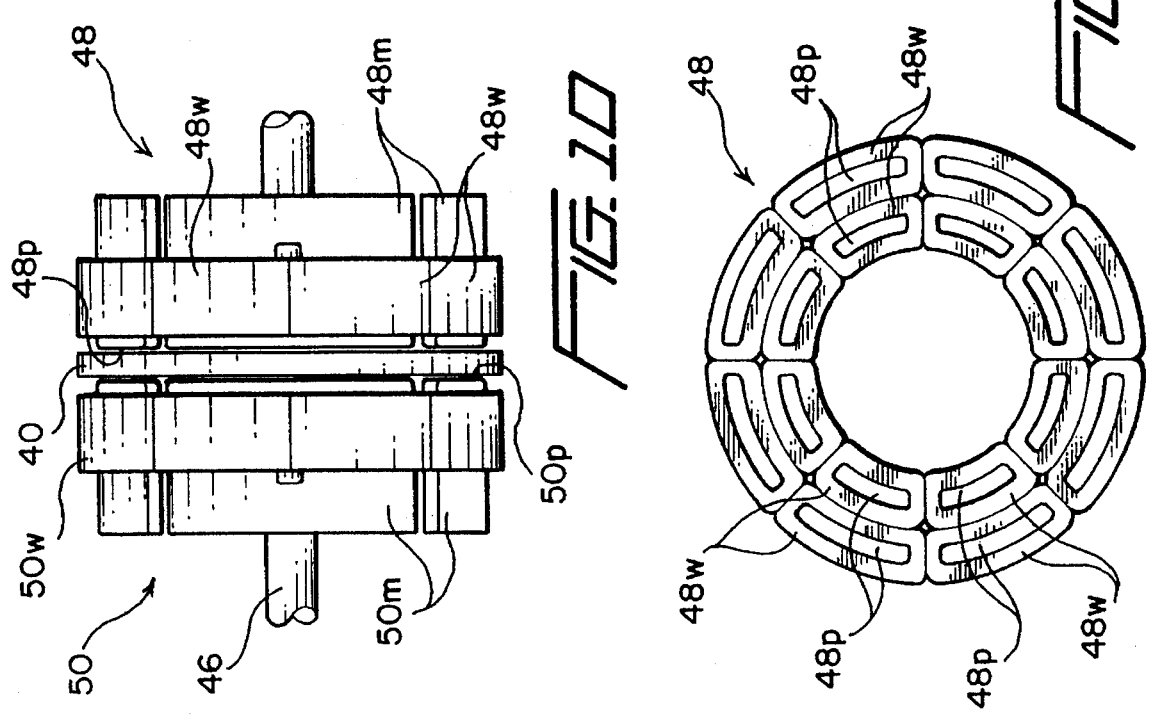
FIG. 10
FIG. 11

LORENTZ FORCE MAGNETIC BEARING UTILIZING CLOSED CONDUCTIVE LOOPS AND SELECTIVELY CONTROLLED ELECTROMAGNETS

REFERENCE TO RELATED APPLICATIONS

This is a continuation-in-part of U.S. patent application Ser. No. 07/996,192 filed Dec. 23, 1992, now U.S. Pat. No. 5,302,874, which in turn is a continuation-in-part of application Ser. No. 07/950,607 filed Sep. 25, 1992, now abandoned. The entirety of these earlier applications is incorporated herein by reference.

BACKGROUND OF THE INVENTION

This invention relates to an active magnetic bearing, i.e. a bearing in which magnets are actively controlled in order to affect the relative positioning of a rotor and a stator.

Active magnetic bearings are commercially available. Most of these bearings use only electromagnetic attraction forces to levitate and position rotor shafts. Such bearings are only able to pull on a ferromagnetic rotor, and this limits their maximum force capability. According to the present invention, pulling and pushing forces can be exerted on the rotor, thus giving the bearing a high force capability and reliability.

All of the energy and power used to support a rotor in a conventional magnetic bearing comes from the electrical energy supplied to the electromagnets. This requires a large power source and electronic switches. These components are very expensive and space-consuming. In contrast, an active magnetic bearing according to the present invention derives most of its energy and power from the kinetic energy of the rotor. The rotor receives this energy from a conventional prime mover. The overall effect is that the present invention makes it possible to reduce significantly the size and cost of the power supply and switching system.

Another deficiency of commercial active magnetic bearings is that they are highly non-linear. The force they provide varies significantly with changes in the rotor position and the field level in their saturable ferromagnetic rotors. This deficiency is overcome by the present invention since the rotor is made of nonmagnetic material which does not saturate. Therefore, the applied force does not change significantly with changes in the rotor position.

Another problem experienced with existing magnetic bearings is that, due to their inherent physical limitations, they cannot withstand momentary pulse loads. Bearings according to the invention can withstand very high pulse loads because they can withdraw large amounts of power from the rotor's kinetic energy. Other active magnetic bearings are able to produce about 100 psi of "magnetic pressure," while a bearing according to the invention can, for brief periods of time up to a few seconds, provide magnetic pressure exceeding 1000 psi.

SUMMARY OF THE INVENTION

This invention relates to an active magnetic bearing system in which selectively energized electromagnet fields interact with a closed loop of electrically conductive material which is carried by an object. The object and the electromagnets are relatively rotatable about an axis of rotation so that the loop travels along a prescribed circular path relative to and through the selectively energized magnetic fields. Either the object or the electromagnets may be stationary. The electromagnets, when energized, produce magnetic fields which are positioned to subject the interior of the relatively moving loop to magnetic flux. The magnetic field strengths may range from zero to any finite value. This produces an electromotive force in the loop so that an electrical current will be induced in the loop. The electrical current has a direction which, in the presence of the energized magnetic fields, exerts Lorentz forces on the loop in a lateral direction. The lateral direction has axial and/or radial components. Control means are provided for selectively energizing the electromagnets to change the strengths of the magnetic fields, thus affecting the position of the loop and object relative to the electromagnets.

There are a number of optional features of the invention. For example, there may be a plurality of loops, and the control means may change the strengths of the magnetic fields nonuniformly to force the loops toward the prescribed paths. The field strengths are changed from zero to a finite value, or they may be changed from one finite value to another finite value. The control means includes (i) a sensor means for providing signals indicative of deviations of the loop from its prescribed circular path, and (ii) means for energizing the electromagnets and changing the strengths of said magnetic fields in response to signals from the sensor means to correct the deviations. The loop is formed of electrically conductive material which has a finite conductivity, the electromagnets have pole surfaces formed of magnetic material, and the electromagnets are stationary. The electromagnets are arranged to produce circumferentially adjacent magnetic fields which are oppositely directed, and/or radially adjacent magnetic fields which are oppositely directed. In a radial bearing, the electromagnets have pole surfaces of magnetic material which face in an axial direction. In an axial bearing, electromagnet pole surfaces of magnetic material face in a radial direction.

Also, it is preferred that the loop be located between mutually facing poles of opposite polarities. The loop has opposed first and second legs, and there are two concentric rings of electromagnets. The first ring of magnets has poles which face the first leg but not the second leg of the loop, and the second ring of magnets has poles which face the second leg but not the first leg of the loop.

BRIEF DESCRIPTION OF THE DRAWINGS

FIG. 1 is a partially diagrammatic exploded view of the principal components of an axial bearing constructed according to the invention.

FIG. 2 is a diagrammatic radially-looking sectional view of an assembled axial bearing constructed according to the invention.

FIG. 3 is a diagrammatic axially-looking sectional view of the bearing of FIGS. 1 and 2.

FIG. 4 is a side view of the bearing of FIGS. 1–3.

FIG. 5 illustrates the travel of the rotor loops through the magnetic fields in the axial bearing of FIGS. 1–4.

FIGS. 6 and 7 are graphs which show, respectively, the loop currents and the Lorentz forces in the axial bearing of FIGS. 1–5.

FIG. 10 is a side view of a complete radial bearing according to the invention.

FIG. 11 is a view of the face of one of the magnet assemblies in the radial bearing.

FIG. 12 is a graph showing the loop currents in the radial bearing of FIGS. 8–11.

DETAILED DESCRIPTION

Figure 8:
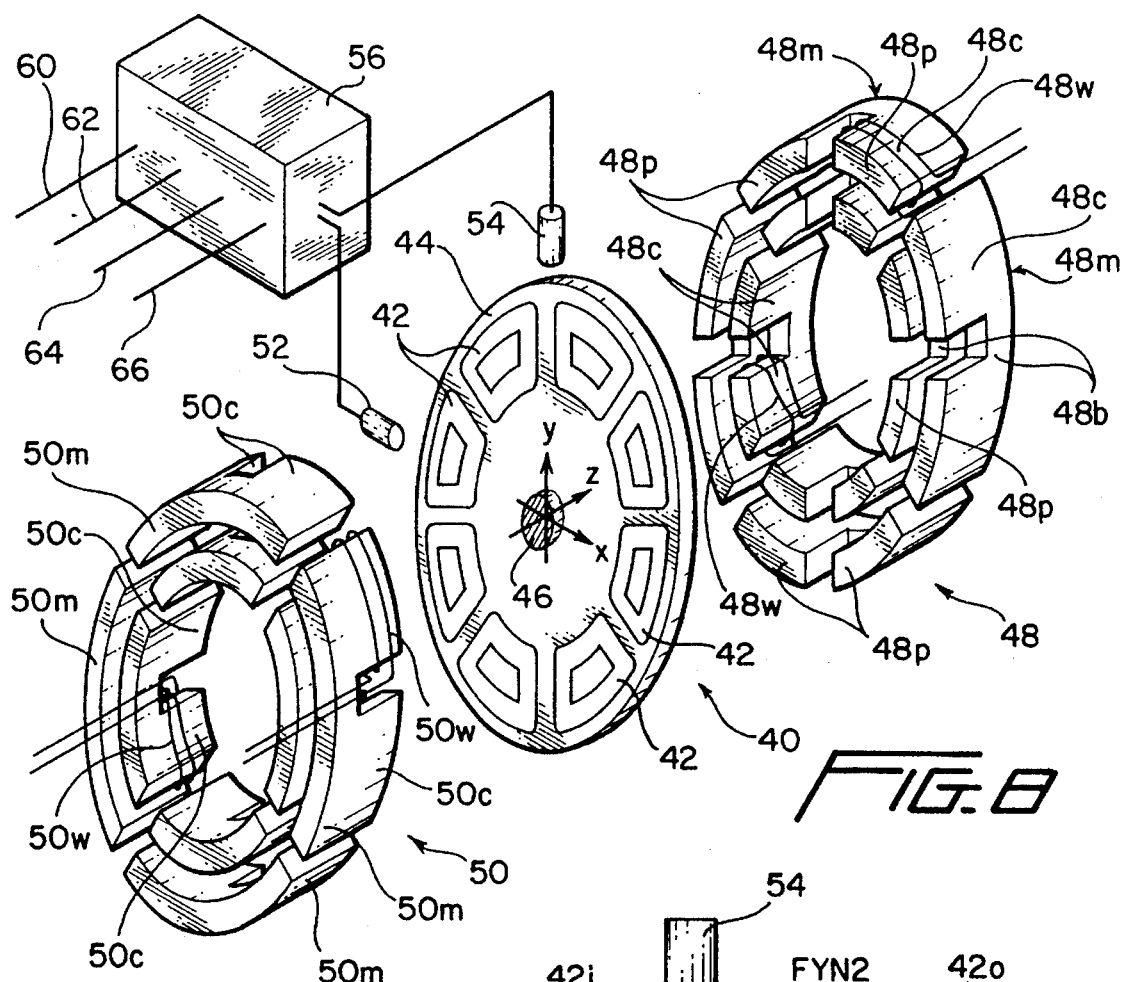
FIG. 8 is a partially diagrammatic exploded view of the principal components of an radial bearing constructed according to the invention.

The bearing of the present invention utilizes an object which is provided with closed loops of electrically conductive material. Each loop travels through an endless series of magnetic fields produced by electromagnets. The magnetic fields are activated selectively to control the position of the object relative to the electromagnets. The movement of a loop through an active magnetic field creates an electromotive force, and this induces an electrical current in the loop. This current, while in a magnetic field, exerts Lorentz forces on the loop to reposition the loop-carrying object.

Preferably, an axial bearing and a radial bearing are connected to a common shaft. In an orthogonal x-y-z coordinate system, the bearing's rotational axis is the z axis, and the bearing's radial plane is defined by the x and y axes.

Axial Bearing

The structure and the operation of the axial bearing are shown in FIGS. 1–8. In FIG. 1 it can be seen that a rotor 2 has a plurality of conductive loops 4 which are equally spaced about the circumference of a cylinder 6 which is nonconductive and nonmagnetic. These loops 4 may be imbedded in the cylinder, or they may be located on its surface. The loops are formed of litz wire to limit the skin effect and to reduce eddy current heating. Each of the loops 4 has a self inductance which delays the buildup and decay of currents in the loop. Ideally, the inductive time constant of the loop is chosen to match one-half the minimum time required for the loop to travel a distance equal to its own length at maximum loop speed. The mathematical formula for this relationship is
$L/R \sim D/2v$, where L is the self-inductance of the loop, R is the resistance of the loop, D is the longitudinal dimension of the loop in the circumferential direction and v is the maximum operating speed of the rotor.

Axial positioning of the rotor 2 is produced by interaction between the loops 4 and an array of electromagnets which are selectively controlled to produce and/or vary magnetic fields in field zones through which the loops travel. Mutually facing pole surfaces 16p and 22p, and mutually facing pole surfaces 18p and 24p are arranged to provide radially directed magnetic flux lines in the field zones.

The axial magnetic bearing according to the invention has a position sensor 12 which is connected to the control system to detect the axial location of the rotor. Location-indicating information is fed from the position sensor 12 to a control system 14. Based on this information, the control system actively controls the electromagnets to produce magnetic fields which induce currents in the loops 4 and interact with these currents to position the rotor in an axial direction.

The travel of the loops through the field zones of the electromagnets is illustrated schematically in FIG. 5 where portions of the surface of the cylindrical rotor and the respective field zones are laid out flat for illustrative purposes. Only four loops and eight fields are shown, although it will be recognized that the entire rotor has eight loops which travel through sixteen field zones. As mentioned above, magnetic fields are selectively activated in the field zones by the control means which operates in response to changes in the axial position of the rotor.

The reference characters used to identify the magnetic fields are informative in the respect that they identify their functions. The characters "FZP" identify fields which, when activated, cause the rotor to move in a positive direction of the axis z. Similarly, the characters "FZN" signify fields which will move the rotor in a negative direction of the z axis.

The magnetic fields FZP1, FZP2, FZP3, FZP4, FZN1, FZN2, FZN3, and FZN4 are produced by the two stationary electromagnet assemblies 8 and 10 shown in FIGS. 1 and 2. The inner assembly 8 has a plurality of poles 16p, 18p, which face radially outwardly. The outer assembly 10 has poles 22p, 24p which face radially inwardly toward corresponding poles on the inner assembly so that, when activated, each inner-outer pole pair will create a magnetic field in one of the zones such as those shown in FIG. 5.

The inner magnet assembly has a right core member 16 and a left core member 18. From the geometric center point 20 of the axial bearing (FIGS. 2 and 3), the right core member 16 is in the positive direction of the z-axis, and the left core member 18 is in the negative direction of the z-axis. Each core member 16, 18 has a continuous interior ring and eight outwardly radiating field cores 16c, 18c which terminate at the pole surfaces 16p, 18p of the magnets. Magnet windings 16w and 18w are wound around each of the respective field cores 16c and 18c. Most of the electromagnet field windings have been omitted from FIG. 1 for simplification. A few are shown diagrammatically. It will be understood that each of the thirty-two field cores has field coil windings wound around it.

The outer magnet assembly 10 also has a right core member 22 and a left core member 24 which lie, respectively, in positive and negative z-axis directions from the geometric center point 20 of the axial bearing. Each of these core members has a continuous outer ring and eight inwardly radiating field cores 22c, 24c. Electromagnet windings 22w, 24w are wound around each of these field cores. The interior end surfaces of these field cores are the magnet poles 22p, 24p of the outer magnet assembly.

The directions of the electromagnet windings and the polarities of the power source determine the polarities of the poles 16p, 18p, 22p, 24p. When the magnets are activated, circumferentially adjacent poles have opposite polarities, and poles which face each other radially have opposite polarities.

In the axial bearing, the axial position of the rotor 2 is controlled by simultaneously activating either (a) all of the electromagnets on the right core members 16 and 22, or (b) all of the electromagnets on the left core members 18 and 24.

The control means 14 for the axial bearing is shown schematically in FIG. 1. As mentioned above, it receives inputs from the position sensor 12 to ascertain the location of the rotor 2 along the rotation axis, and it selectively controls the electromagnets which produce the magnetic fields in the field zones through which the loops travel. The activating electrical conductors from the control system to the windings are shown in FIG. 1. The windings 16w on the core member 16 are connected to the conductor 16a from the control system 14. Similarly, the windings 18w, 22w, and 24w are connected to respective conductors 18a, 22a, and 24a from the control system. The eight windings on each of the core members 16, 18, 22, and 24 can be connected together in series or in parallel.

More specifically, the control means has three output states. In the first state all magnet windings are inactive. This state is utilized when the rotor is at a desired and prescribed axial position. In the second state which is initiated when the sensor determines that the rotor has drifted to the right (i.e. in a positive z axis direction), the windings 16w, 22w on the right field cores 16c, 22c are activated via the conductors 16a and 22a to create magnetic fields in the corresponding field zones. The third state is initiated when the sensor determines that the rotor has drifted to the left, i.e. in a direction which is negative with respect to the direction represented by the z axis vector. In the third state, the conductors 18a and 24a are energized so that only the windings 18w, 24w on the left field cores 18c, 24c are activated.

The control means 14 may incrementally or infinitely vary the current in the windings so that this current is proportional to both (a) the off-center axial displacement of the rotor, and (b) the velocity at which the rotor's axial displacement is changing. The displacement and the velocity each have a separate proportionality constant. The latter provides active damping to the system. Larger axial displacements of the rotor will result in the supply of higher currents to the involved field cores. Also, the control means 14 may continuously produce low level currents in all electromagnet windings to provide passive positioning of the rotor 2, and then selectively produce higher currents when necessary to expedite the return of the rotor to its prescribed position.

The operation of the axial bearing will now be described in more detail, with reference to FIG. 5. The four loops 4a, 4b, 4c, and 4d are travelling in the direction indicated by the arrow 26. The nominal zones of eight available magnetic fields through which the loops travel are identified by the reference numerals FZP1–FZP4 and FZN1–FZN4. As mentioned above, the existence and/or strengths of these fields will change from time-to-time.

The flux lines in field zones FZP1, FZP3, FZN1, and FZN3 will be directed into the plane of FIG. 2; and, the flux lines in field zones FZP2, FZP4, FZN2, and FZN4 will be directed out of the plane of FIG. 2 when the respective magnets are selectively activated. The fields in zones FZP1, FZP2, FZP3, and FZP4 are produced by the first sets of electromagnets on the left members 18 and 24, and the fields in zones FZN1, FZN2, FZN3, and FZN4 are produced by the second sets of electromagnets on the right members 16 and 22.

When the loops are in their prescribed axial position shown in FIG. 2, no corrective force is required. All electromagnets are inactive so the field strengths in all zones can be zero. If the rotor cylinder 6 and loops 4a, 4b, 4c, and 4d drift axially to the right, in the positive direction of the arrow z, this will be sensed by the position sensor 12. This causes the control system 14 to activate all magnets in the right sets 16 and 22 so that magnetic fields are produced in the zones FZN1, FZN2, FZN3, and FZN4. The zones FZP1, FZP2, FZP3, and FZP4 remain inactive. Under these conditions, movement of the axially extending legs of the loop 4a through the active fields will create an electromotive force which causes currents to flow in the loop 4a. Due to the loop's self inductance, there are delays in the buildup and decay of these currents. The field zones are positioned where each of their fields will affect only one circumferential leg 28 of the loop 4a. The current flowing in this leg 28, in the presence of these magnetic fields, produces axially directed Lorentz forces on the loop, thus moving the rotor axially to the left, back toward its prescribed position.

The magnitudes and directions of the currents in loop 4a as a function of time are shown in FIG. 6. From $t_0$ to $t_1$ while the loop 4a is entering the field FZN3, the loop current is increasing. During the time interval from $t_1$ to $t_2$, the loop 4a is totally immersed in the field FZN3, and the loop current decays to zero. From $t_2$ to $t_3$, while the loop is leaving field FZN3 and entering field FZN2, the loop current becomes negative. In the time from $t_3$ to $t_4$, the loop is totally immersed in the second field FZN2, and the loop current decays from a negative value to about zero. Continued movement of the rotor during the time $t_4$ to $t_5$ causes the loop to leave the field FZN2 while it enters the field FZN1. After $t_5$, the loop is in the field FZN1, and the loop current decays to zero.

The average magnitude of the axial force on the loop 4a from $t_0$ to $t_6$ is positive, thus tending to move the loop 4a and the rotor to the left. FIG. 7 shows this force during the time from $t_4$ to $t_6$, where it briefly descends into the negative region and then becomes positive so as to push the loop back toward the position shown in solid lines (FIG. 5). All eight loops 4 are undergoing these events eight times during each revolution, so the axial force is significant and effective. When the loop returns to its prescribed axial position, the sensor 12 causes the control means 14 to deactivate the magnets which produce the fields FZN1–FZN4 until such time that the rotor again drifts in a positive axial direction from its prescribed position.

If the rotor drifts toward the left, i.e. in the negative direction with respect to the arrow z, the electromagnets for producing the fields FZP1, FZP2, FZP3, and FZP4 are activated. This sets into motion a series of events which are a mirror image of those discussed above with respect to positive drift. Movement of the axially oriented legs of the loop through the fields creates forces and currents in the loops 4. Since the loop is in the magnetic fields FZP1, FZP2, FZP3, and FZP4, the current in circumferential leg 30 of the loop results in Lorentz forces which move the loop 4 and rotor 2 in a positive direction. When the rotor returns to its prescribed position, the sensor 12 and the control means deactivate the respective electromagnets.

Radial Bearing

A radial bearing constructed according to the invention is illustrated in FIGS. 8–11. FIG. 8 shows a rotor 40 provided with a plurality of circumferentially spaced conductive loops imbedded in or mounted on a disc which is nonconductive and nonmagnetic. The loops have an inductance such that the inductive time constant is $L/R \sim D/2v$, the parameters of which were previously described in connection with the axial bearing.

The loops are located in a plane defined, in an orthogonal coordinate system, by the axes x and y. The disc is fixed to a shaft which rotates about an axis which substantially coincides with the axis z of the coordinate axis system. Preferably the shaft is integral with or rigidly fixed to the shaft of the axial bearing shown in FIG. 1, so the entire rotor assembly will be effectively positioned both axially and radially.

The magnetic fields in the radial bearing are produced by two stationary electromagnet assemblies 48 and 50 which are shown in FIGS. 8, 10 and 11. The first assembly 48 has eight core members 48m arranged in two substantially cylindrical sets of four. Each core member 48m has a back portion 48b and two axially extending field cores 48c which terminate at the pole surfaces 48p. All sixteen cores 48c of the assembly 48 have field coil windings 48w wound around them, but most of these windings have been omitted from FIG. 9 for ease of understanding.

The pole surfaces 48p form an inner ring of eight poles and an outer ring of eight poles. The pole surfaces in the inner ring are substantially aligned with the outboard circumferential legs of the loops 42, and the pole surfaces on the inner ring are substantially aligned with the inboard circumferential legs of the loops. Thus, the magnets, when activated, will selectively create the fields in the field zones shown in FIG. 9.

The second magnet assembly 50 is essentially identical to the first magnet assembly. Windings 50w are wound on the cores 50c of sixteen core members 50m. The pole surfaces 50p form two concentric rings, and the polarities of these poles alternate circumferentially.

The two assemblies 48 and 50 are arranged so that mutually facing pole surfaces will have opposite magnetic polarities. Such opposed poles will be simultaneously activated so that the magnetic lines of flux will extend axially from one magnet assembly to another.

The windings 48w and 50w are selectively energized to control the position of the rotor in a radial plane, so that the rotational axis will coincide with the axis z, and the loops 42 will follow a prescribed path.

The radial magnetic bearing has two position sensors 52 and 54 which respectively sense the location of the rotor 40 in the directions of coordinate axis x and coordinate axis y. These position sensors are connected to a control system 56 which selectively controls the electromagnet windings 48w and 50w. As will be described below, the electromagnets, when active, produce axially directed magnetic fields which induce currents in the loops 42 on rotor 40. The magnetic fields interact with the induced currents to produce Lorentz forces which laterally reposition the rotor in a radial direction.

Figure 9:
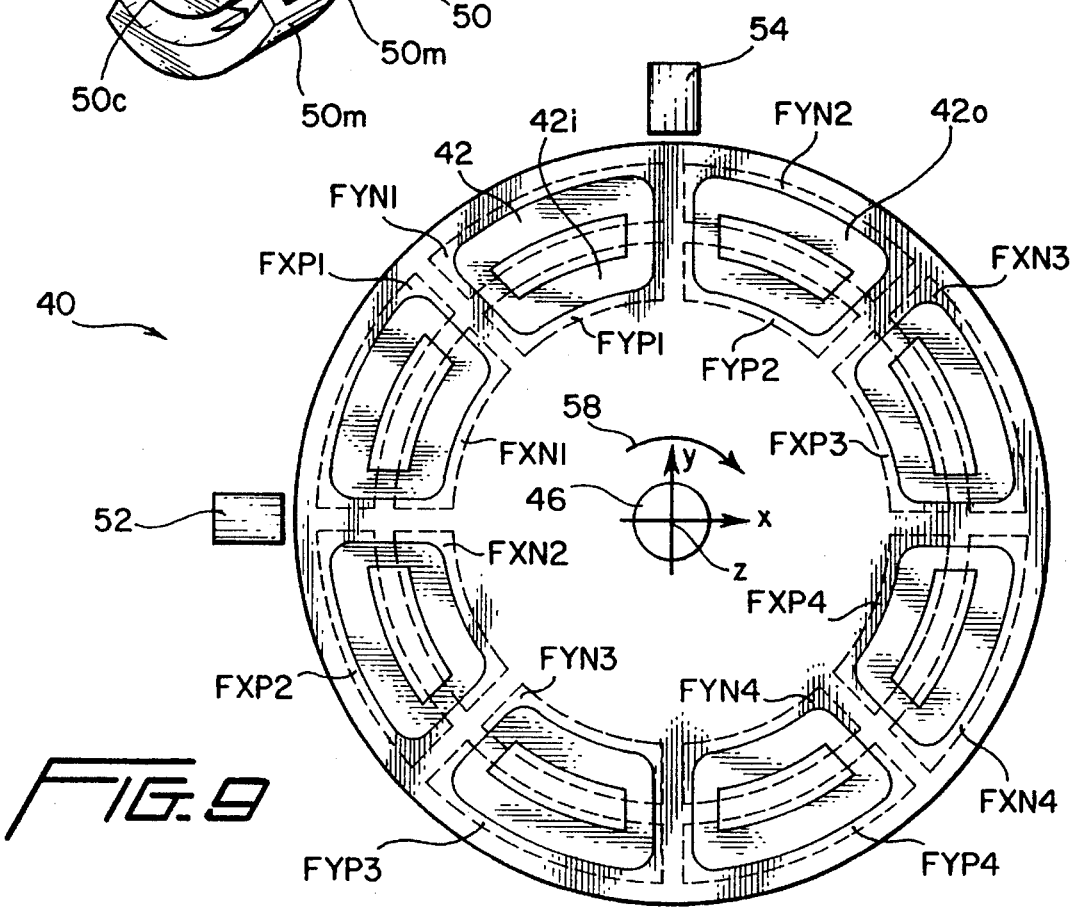
FIG. 9 is an axially-looking diagrammatic view of the loops moving through the magnetic fields in the radial bearing of FIG. 8.

The travel of the loops 42 through the field zones of the electromagnets is illustrated schematically in FIG. 9. The magnetic fields have reference characters which identify their function in the respect that "FXP" identifies fields which, when activated, cause the rotor to move in a positive direction of the axis x. Similarly, "FXN" signifies leftward movement along the axis x, "FYP" indicates positive movement on the y axis, and "FYN" indicates negative movement on the y axis.

The field directions alternate circumferentially from field-to-field. Thus, when the magnets are activated individually, a magnetic field will move out of the plane of FIG. 9 in field zones FYN1, FXN3, FYP4, FXP2, FXN1, FYP2, FXP4, and FYN3. When individually activated, magnetic fields will move into the plane of the paper in field zones FYN2, FXN4, FYP3, FXP1, FYP1, FXP3, FYN4, and FXN2.

The operation of the radial bearing will be described now in greater detail. The loops 42 travel in the circumferential direction indicated by the arrow 58. The inboard legs 42i of the loops travel through the inboard magnetic field zones and the outboard legs 42o of the loops travel through the outboard magnetic field zones. When the sensors 52 and 54 indicate that the rotor is in its designed prescribed position, all of the magnet fields are inactive. However, when the sensors detect any radial deviation of the rotor from its prescribed position, the control means will activate the magnets to correct the deviation.

By way of example, if the rotor axis drifts to the left of the axis z as seen in FIG. 9, the control system 56 will energize the conductor 60 which is connected to and will activate the magnets associated with the field zones FXP1, FXP2, FXP3 and FXP4. All other field zones remain inactive. As a loop moves into one of the active fields, the field will create an electromotive force in the loop, and this will cause a current to flow in the endless loop. The self inductance of the loop will delay the buildup and decay of this current. The induced current flowing in the inboard leg 42i of the loop will be in one or two of the active magnetic fields, and this will produce Lorentz forces on the loop and rotor. The direction of these forces will be in a right direction in FIG. 9, i.e., in the positive direction of the axis x. These forces will return the rotor to its centered position so that the loops will again travel in their prescribed paths. This centered condition is sensed by the sensor, and the control means will deactivate the involved magnets.

The loop currents in the radial bearing are shown in FIG. 12. During the time period from $t_0$ to $t_6$, the loop travels 90° through two successive activated magnetic fields FXP2 and FXP1. During the second and fourth 90° of loop travel, the current will be approximately zero. During the third 90° of travel, the loop will travel through the active fields FXP3 and FXP4, and the current will be an inverted version of FIG. 12.

In a similar manner, when the rotor drifts to the right in FIG. 9, a corrective movement in the negative direction of the x axis is in order. Such a correction is achieved by the control means by activating the conductor 62 which is connected to the magnets associated with field zones FXN1, FXN2, FXN3 and FXN4.

Simultaneously with the foregoing events, the y axis sensor 54 is monitoring the position of the rotor 40, and the control means 56 is activating and deactivating magnets to maintain the loops 42 on the prescribed path. When the rotor 40 moves up above the prescribed position, corrections in the negative direction of the axis y are in order, and this is achieved by activating the conductor 64 which is connected to the magnets which create the fields in field zones FYN1, FYN2, FYN3 and FYN4. Conversely, downward movement of the rotor requires a correction in the positive direction of axis y, and this correction is achieved by conductor 66 which activates the magnets which create the fields FYP1, FYP2, FYP3 and FYP4.

This specification has described only a preferred embodiment of the invention. Individuals familiar with the field of the invention will realize that the invention may take many different forms. For example, the fields may have field strengths which are greater than zero, even when the rotor is at its prescribed position. This will provide levitation and/or some passive positioning of the rotor, even before the active positioning which occurs when the sensors detect any deviations in the rotor position.

Another variation is that a radial bearing may have only a single ring of fields rather than two concentric rings. Each field may be substantially radially coextensive with the loops. With such an arrangement, diametrically opposed loops will not simultaneously be energized. For example, shifting the rotor in a negative x-axis direction will be produced by activating the field which lies in the positive x-axis direction; and, shifting the rotor in a positive x-axis direction is achieved by activating the electromagnets which create the magnetic fields on the negative x-axis side of the axis of rotation.

The loops may be on the rotor or on the stator. Although rings of eight loops and eight magnetic fields have been illustrated, it will be understood that more or less of either are possible within the spirit of the invention. Single loops are shown, but arrangements may be devised in which a loop has portions which are on circumferentially spaced and/or diametrically opposed areas of the rotor.

In view of the many possibilities which exist for improvements and modifications, it is emphasized that the invention is not limited solely to the disclosed embodiment but embraces modifications, improvements, and variations which fall within the spirit of the following claims.

I claim:

1. A magnetic bearing system, comprising, an object which includes a closed loop of electrically conductive material which has a finite conductivity, said loop being unconnected electrically to any power source, a stationary set of electromagnets for producing a plurality of selectively controllable magnetic fields, said object being rotatable about an axis of rotation so that, when the electromagnets are energized, said loop travels along a prescribed circular path relative to and through said magnetic fields, said electromagnets, when energized, producing magnetic fields positioned to subject said loop to magnetic flux to produce electromotive forces in said loop so that an electrical current is induced in said loop; said electrical current having a direction which, in the presence of said magnetic fields, exerts Lorentz forces on said loop in a lateral direction; and control means for selectively energizing said electromagnets and changing the strengths of said magnetic fields to affect the position of said loop and said object relative to said electromagnets.

2. A magnetic bearing system according to claim 1 wherein the control means changes the strengths of the magnetic fields to vary the stiffness of the bearing.

3. A magnetic bearing system according to claim 1 wherein the control means changes the strengths of the magnetic fields uniformly to force said loop toward the prescribed path.

4. A magnetic bearing system according to claim 1 wherein said control means includes (i) a sensor means for providing signals indicative of deviations of said loop from its prescribed circular path, and (ii) means for energizing said electromagnets and changing the strengths of said magnetic fields in response to said signals to affect said force.

5. A magnetic bearing system according to claim 1 wherein said electromagnets have pole surfaces formed of magnetic material.

6. A magnetic bearing system according to claim 1 wherein said electromagnets produce adjacent magnetic fields which are oppositely directed.

7. A magnetic bearing system according to claim 1 wherein said electromagnets produce circumferentially adjacent magnetic fields which are oppositely directed.

8. A magnetic bearing system according to claim 1 wherein said electromagnets produce radially adjacent magnetic fields which are oppositely directed.

9. A magnetic bearing system according to claim 1, wherein said object is provided with a plurality of said loops which are arranged in a ring which is concentric with said axis.

10. A magnetic bearing system according to claim 1 wherein said electromagnets include mutually facing poles of opposite polarities and said loop is located between said mutually facing poles.

11. A magnetic bearing according to claim 1 wherein said control means changes the strengths of said magnetic fields from zero to a finite value.

12. A magnetic bearing system according to claim 1 wherein said lateral direction is axial with respect to said axis of rotation.

13. A magnetic bearing system according to claim 1 wherein said lateral direction is radial with respect to said axis of rotation.

14. A magnetic bearing system according to claim 1, wherein said loop has opposed first and second legs, and said electromagnets include two concentric rings of magnets, a first said ring of magnets having poles which face said first said leg but not said second leg, a second said ring of magnets having poles which face said second leg but not said first leg.

15. A magnetic bearing system according to claim 14, wherein said electromagnets have pole surfaces formed of magnetic material which face in an axial direction.

16. A magnetic bearing system according to claim 14, wherein said electromagnets have pole surfaces formed of magnetic material which face in an radial direction.

17. A magnetic bearing system, comprising, an object which includes a closed loop of electrically conductive material which is unconnected electrically to any power source, a stationary set of electromagnets for producing a plurality of selectively controllable magnetic fields, said object being rotatable about an axis of rotation so that, when the electromagnets are energized, said loop travels along a prescribed circular path relative to and through said magnetic fields, said loop having opposed first and second legs, said electromagnets including two concentric rings of magnets, a first said ring of magnets having poles which face said first said leg but not said second leg, a second said ring of magnets having poles which face said second leg but not said first leg, said electromagnets, when energized, producing magnetic fields positioned to subject said loop to magnetic flux to produce electromotive forces in said loop so that an electrical current is induced in said loop; said electrical current having a direction which, in the presence of said magnetic fields, exerts Lorentz forces on said loop in a lateral direction; and control means for selectively energizing said electromagnets and changing the strengths of said magnetic fields to affect the position of said loop and said object relative to said electromagnets.

18. A magnetic bearing system according to claim 17, wherein said electromagnets have pole surfaces formed of magnetic material which face in an axial direction.

19. A magnetic bearing system according to claim 17, wherein said electromagnets have pole surfaces formed of magnetic material which face in an radial direction.

* * * * *